US012566388B2

(12) United States Patent
Okano et al.

(10) Patent No.: US 12,566,388 B2
(45) Date of Patent: Mar. 3, 2026

(54) ELECTROPHOTOGRAPHIC BELT AND ELECTROPHOTOGRAPHIC IMAGE-FORMING APPARATUS

(71) Applicant: CANON KABUSHIKI KAISHA, Tokyo (JP)

(72) Inventors: Akira Okano, Kanagawa (JP); Takeaki Kumagai, Tokyo (JP); Atsushi Hori, Chiba (JP); Megumi Uchino, Tokyo (JP); Koji Sato, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 18/055,705

(22) Filed: Nov. 15, 2022

(65) Prior Publication Data

US 2023/0152720 A1 May 18, 2023

(30) Foreign Application Priority Data

Nov. 18, 2021 (JP) ................................ 2021-188142

(51) Int. Cl.
*G03G 5/14* (2006.01)
*G03G 7/00* (2006.01)

(52) U.S. Cl.
CPC ........... *G03G 5/142* (2013.01); *G03G 7/0053* (2013.01)

(58) Field of Classification Search
CPC ............................ G03G 5/142; G03G 7/0053
See application file for complete search history.

(56) References Cited

U.S. PATENT DOCUMENTS

2006/0172097 A1* 8/2006 Morikoshi ............... G03G 5/10 428/141
2015/0072148 A1* 3/2015 Hayashi ............. G03G 15/1605 399/302

(Continued)

FOREIGN PATENT DOCUMENTS

JP 2006133527 A 5/2006
JP 2011197404 A * 10/2011

(Continued)

OTHER PUBLICATIONS

English machine translation of the description of JP-2011197404-A (Year: 2011).*

(Continued)

*Primary Examiner* — Mark F. Huff
*Assistant Examiner* — Boone Alexander Evans
(74) *Attorney, Agent, or Firm* — Canon U.S.A., Inc. IP Division

(57) ABSTRACT

An electrophotographic belt includes a base layer containing a binder resin and carbon black in the binder resin. The binder resin contains at least one resin selected from the group consisting of PEEK and PPS. A water content calculated by $((X2-X1)/X2)\times100$ is 0.6% where X1 is a mass of a specimen cut out of the base layer when in a nitrogen atmosphere a temperature of the specimen is increased from 30° C. to 100° C. at a rate of 20° C./min. and maintained at 100° C. for 30 min, and X2 is a mass of the specimen when in a nitrogen atmosphere the specimen is thereafter cooled from 100° C. to 30° C. at a rate of 20° C./min. and the specimen is left to stand in the air under an environment of a temperature of 23° C. and a relative humidity of 50% for 48 hours.

4 Claims, 2 Drawing Sheets

(56) References Cited

U.S. PATENT DOCUMENTS

| | | | |
|---|---|---|---|
| 2020/0019093 | A1 | 1/2020 | Tsuruga et al. |
| 2022/0082964 | A1 | 3/2022 | Suzuki et al. |
| 2022/0187741 | A1 | 6/2022 | Suzuki et al. |

FOREIGN PATENT DOCUMENTS

| | | | |
|---|---|---|---|
| JP | 2012133220 | A | 7/2012 |
| JP | 2012177811 | A | 9/2012 |
| JP | 2020012919 | A | 1/2020 |
| JP | 2022049675 | A | 3/2022 |
| JP | 2022094202 | A | 6/2022 |

OTHER PUBLICATIONS

Web, Lion Specialty Chemicals Co., Ltd., Ketchen Black (EC300J), https://www.lion-specialty-chem.co.jp/ja/catalog/01/k.php, retrieved Sep. 15, 2025.

Web, Mitsubishi Chemical, #3230B, www.carbonblack.jp/product/list2_01.html#3230b, retrieved Sep. 15, 2025.

Web, Mitsubishi Chemical, Orion carbon black catalog, https://orioncarbons.com/wp-content/uploads/2023/04/22_06_21_td_0112_farbrusstabelle_emea_web_2.pdf, retrieved Sep. 15, 2025.

* cited by examiner

ELECTROPHOTOGRAPHIC BELT AND ELECTROPHOTOGRAPHIC IMAGE-FORMING APPARATUS

BACKGROUND

Technical Field

The present disclosure relates to an electrophotographic belt and an electrophotographic image-forming apparatus.

Description of the Related Art

Electrophotographic image-forming apparatuses, hereafter also referred to as "electrophotographic apparatuses", such as copying machines and laser beam printers may use an intermediate transfer belt having an endless shape. An electrophotographic belt having an endless shape used for intermediate transfer belt has a monolayer configuration composed of only a base layer or a stacked configuration composed of two or three layers.

Examples of the belt having a two-layer configuration include a belt composed of a base layer and an elastic layer on an outer peripheral surface of the base layer. Further, examples of the belt having a three-layer configuration include a belt composed of a base layer, an elastic layer on an outer peripheral surface of the base layer, and a surface layer on an outer peripheral surface of the elastic layer.

In this regard, it is proposed that a polyether ether ketone or a polyphenylene sulfide which is a super engineering plastic having excellent strength is used for the base layer of such an electrophotographic belt where an inexpensive and easy-to-recycle thermoplastic resin serves as a binder. Hereafter, the polyether ether ketone is also referred to as "PEEK", and the polyphenylene sulfide is also referred to as "PPS". Since crystalline thermoplastic resins such as PEEK and PPS have high melting points, an electro-conductive filler such as carbon black is used as an electro-conductivity imparting agent for imparting the electro-conductivity to the base layer (Japanese Patent Laid-Open No. 2012-177811).

However, when the electrophotographic belt to which an electro-conductivity is imparted with the electro-conductive filler is used as, for example, an intermediate transfer belt and is served for forming electrophotographic images in the long term, sometimes the electrical resistance of the electrophotographic belt is decreased. It is considered that such a decrease in electrical resistance occurs due to a mechanism described below (paragraph [00051] of Japanese Patent Laid-Open No. 2012-177811).

That is, discharge occurs at sections at which the intermediate transfer belt is separated from a primary transfer roller and a secondary transfer roller, and an excessive current flows at a time inside the intermediate transfer belt. In such an instance, a high voltage is applied between carbon black particles which are electro-conductive points, and a binder resin interposed between carbon black particles is heated so as to be carbonized. As a result, the electro-conductivity is enhanced due to continuity between carbon black particles in spite of the essential electrical insulation property therebetween. Japanese Patent Laid-Open No. 2012-177811 discloses that the above-described reduction in the electrical resistance is addressed by improving the dispersibility of the carbon black in the binder resin. For that purpose, repetitive melt-kneading (2 to 6 times) of the carbon black and PEEK is described.

However, repetitive melt-kneading of the binder resin and the carbon black disclosed in Japanese Patent Laid-Open No. 2012-177811 may cause an increase in the production cost of the electrophotographic belt. In addition, it is concerned that repetition of kneading at high temperature may cause thermal deterioration (thermal decomposition or cross-linking due to oxidation) of the binder resin and may cause a reduction in the strength of the electrophotographic belt. Further, even when the dispersibility of the carbon black is highly enhanced, it is difficult to equalize all distances between carbon black particles. Therefore, when an excessive current flows into the intermediate transfer belt, a high voltage is applied between carbon black particles at a relatively small distance. Consequently, it is difficult to completely prevent the binder resin interposed between the carbon black particles from being carbonized. As a result, the present inventors recognized that it is necessary to develop a technology to suppress a change (increase) in the electro-conductivity due to carbonization of the binder resin from occurring by a method other than enhancing the dispersibility of the carbon black.

SUMMARY

At least one aspect of the present disclosure is directed to providing an electrophotographic belt capable of suppressing the electrical resistance from being decreased even when repeatedly used as an intermediate transfer belt in the long period of time. At least one aspect of the present disclosure is directed to providing an electrophotographic image-forming apparatus capable of stably forming high-quality electrophotographic images in the long period of time.

According to at least one aspect of the present disclosure, there is provided an electrophotographic belt including a base layer that contains a binder resin and carbon black in the binder resin, the binder resin containing at least one resin selected from the group consisting of PEEK and PPS, wherein a water content calculated by $((X2-X1)/X2)\times 100$ is 0.6% or more where X1 is a mass of a specimen cut out of the base layer when in a nitrogen atmosphere a temperature of the specimen is increased from a temperature of 30° C. to a temperature of 100° C. at a rate of 20° C. per min. and maintained at 100° C. for 30 min, and X2 is a mass of the specimen when in a nitrogen atmosphere the specimen is thereafter cooled from a temperature of 100° C. to a temperature of 30° C. at a rate of 20° C. per min and the specimen is left to stand in the air under an environment of a temperature of 23° C. and a relative humidity of 50% for 48 hours.

According to at least one aspect of the present disclosure, there is provided an electrophotographic image-forming apparatus provided with the above-described electrophotographic belt as an intermediate transfer belt.

Further features of the present disclosure will become apparent from the following description of exemplary embodiments with reference to the attached drawings.

BRIEF DESCRIPTION OF THE DRAWINGS

FIGS. 2A and 2B-1 to 2B-3 are explanatory diagrams illustrating configuration examples of an electrophotographic belt according to the present disclosure.

DESCRIPTION OF THE EMBODIMENTS

In the present specification, descriptions such as "XX or more and YY or less" and "XX to YY" which express a numerical range are numerical ranges including a lower limit and an upper limit, which are end points, unless otherwise specified. Further, when numerical ranges are described in a stepwise manner, any arbitral combination or combinations of the upper limit of each of the numerical ranges and the lower limit of each of the numerical ranges is/are disclosed in the present specification.

In the present specification, "Ω/□" represents "Ω/square".

Figure 1:
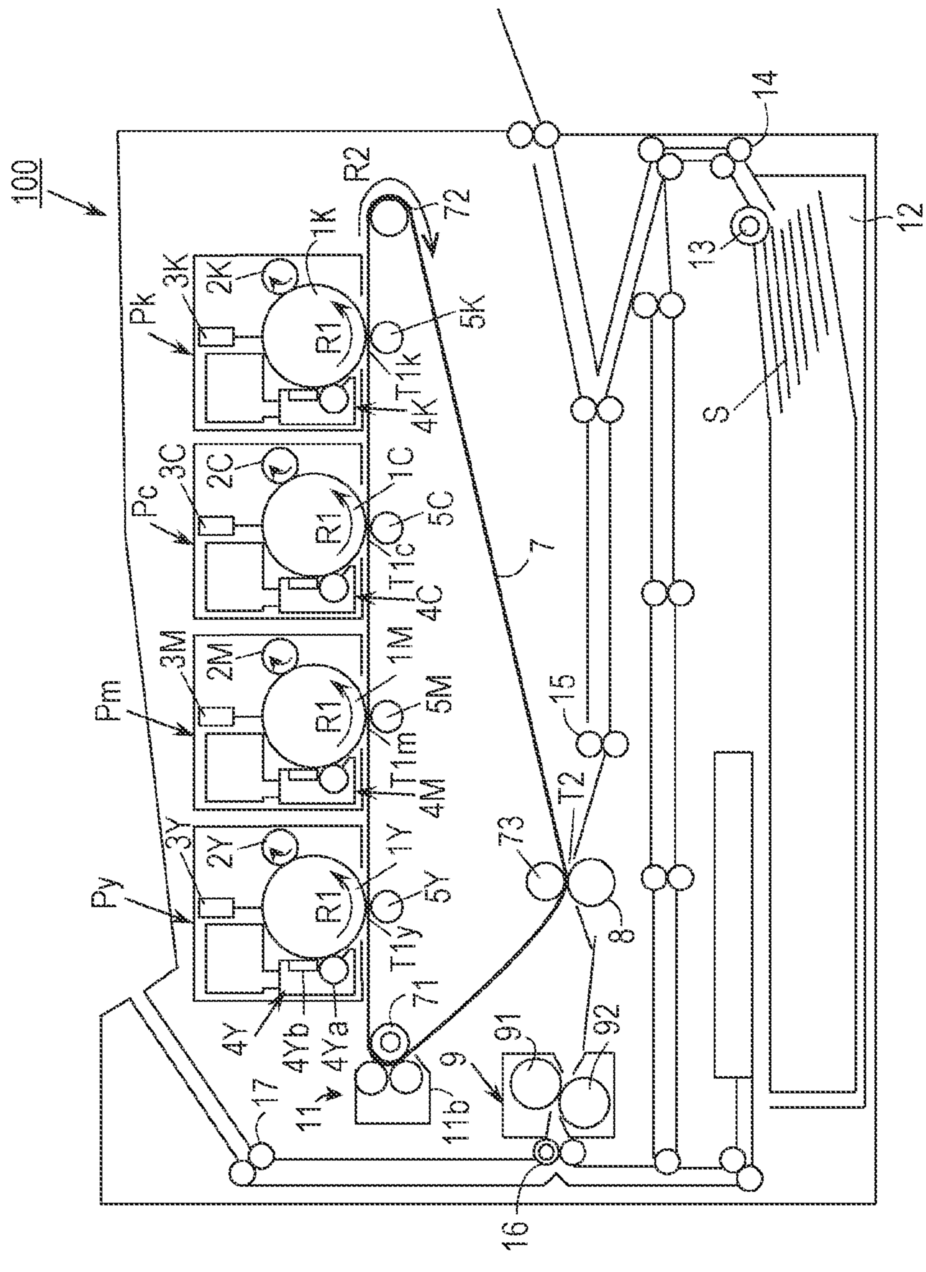
FIG. 1 is a schematic diagram illustrating a cross section of an image-forming apparatus used for evaluating an image.
Figure 2A:
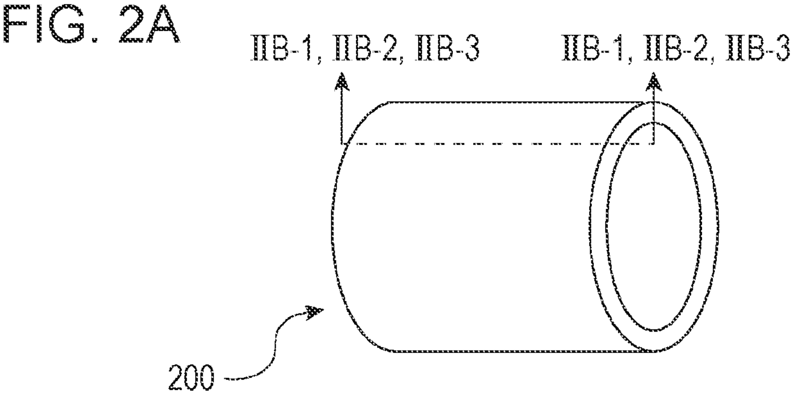
Figures 1, 2B:
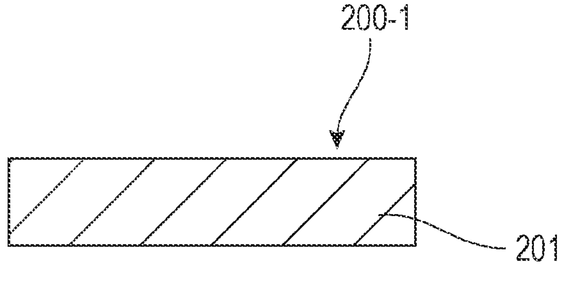
Figures 2, 2B:
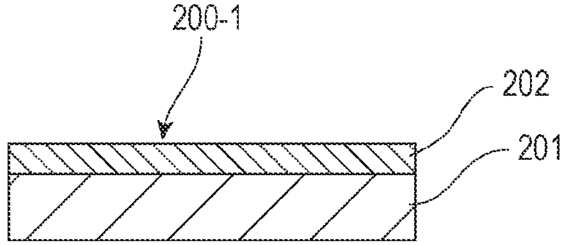
Figures 2, 2B, 3:
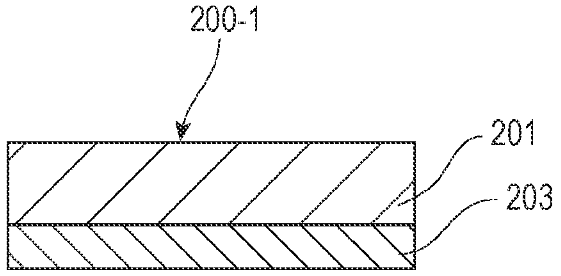

FIG. 2A is a perspective view illustrating an electrophotographic belt 200 having an endless belt shape according to an aspect of the present disclosure. An example of the layer configuration is a monolayer structure in which a cross section cut along line IIB-1, IIB-2, IIB-3-IIB-1, IB-2, IIB-3 in FIG. 2A is composed of only a base layer 201 as illustrated in FIG. 2B-1. In such an instance, an outer surface 200-1 of the base layer serves as a toner-bearing surface (outer surface) of the electrophotographic belt. Another example of the layer configuration is a stacked structure in which the cross section cut along line IIB-1, IIB-2, 11B-3-IIB-1, IIB-2, 11B-3 includes a base layer 201 and a surface layer 202 covering the outer peripheral surface of the base layer 201 as illustrated in FIG. 2B-2. When the surface layer 202 is disposed, an outer surface 200-1 of the surface layer 202 serves as a toner-bearing surface of the electrophotographic belt. Another example of the layer configuration is a stacked structure including a base layer 201 and a back surface layer 203 covering the inner peripheral surface of the base layer 201 as illustrated in FIG. 2B-3. Further, the layer configuration having a three-layer structure (not illustrated in the drawing) including a surface layer covering the outer peripheral surface of the base layer 201 and a back surface layer covering the inner peripheral surface is mentioned.

The base layer contains at least one resin selected from the group consisting of PEEK and PPS as a binder resin and contains carbon black as an electro-conductivity imparting agent. That is, the base layer contains at least PEEK, or contains at least PPS, or contains at least both of PEEK and PPS.

In addition, a value (water content) calculated by ((X2−X1)/X2)×100 is 0.6% or more where a mass of a specimen cut out of the base layer when a temperature of the specimen is increased from a temperature of 30° C. to a temperature of 100° C. at a rate of 20° C. per min in a nitrogen atmosphere and the temperature is maintained at 100° C. for 30 min is denoted as X1, and a mass of the specimen when in a nitrogen atmosphere the specimen is thereafter cooled from a temperature of 100° C. to a temperature of 30° C. at a rate of 20° C. per min and the specimen is left to stand in the air under an environment of a temperature of 23° C. and a relative humidity of 50% for 48 hours is denoted as X2.

Herein, X1 is a mass of the specimen cut out of the base layer when a temperature of the specimen is increased from a temperature of 30° C. to a temperature of 100° C. at a rate of 20° C. per min in a nitrogen atmosphere and the temperature is maintained at 100° C. for 30 min. X1 is placed as a mass of the specimen in a state of being dehydrated (hereafter also referred to as "dry state"). X2 is a mass of the specimen when the specimen in the dry state is cooled from a temperature of 100° C. to a temperature of 30° C. at a rate of 20° C. per min and the specimen is left to stand in the air under an environment of a temperature of 23° C. and a relative humidity of 50% for 48 hours. That is, X2 is placed as a mass of the specimen in a state of having absorbed water after temporarily taking on a dry state (hereafter also referred to as "water-absorbed state").

Therefore, in the present disclosure, the value calculated by ((X2−X1)/X2)×100 is referred to as "water content". In this regard, the present inventors found that the electro-conductivity of an electrophotographic belt provided with a base layer having a water content of 0.6% or more is not readily changed due to even repeated use in the long term. The water content of the base layer according to the present disclosure is more preferably 0.7% or more.

As described above, the mechanism of occurrence of a change in the electro-conductivity (resistance reduction) of the electrophotographic belt, in the related art, provided with the base layer which contains PEEK or PPS as a binder resin and in which carbon black serving as electro-conductive particles are dispersed in the binder resin is considered as described below. That is, the cause is considered to be that the binder resin interposed between carbon black particles is carbonized due to application of a high voltage between carbon black particles.

On the other hand, the base layer according to the present disclosure having a water content measured by the above-described method of 0.6% or more stably contains a predetermined amount of water in a common office environment. Even when the above-described discharge phenomenon occurs and a high voltage is applied between carbon black particles, the energy thereof is consumed in vaporization or electrolysis of water due to the water being stably contained as described above. Consequently, it is considered that carbonization of the binder resin is suppressed from occurring so as to maintain insulation between carbon black particles. As a result, it is considered that the electro-conductivity is not readily changed due to repeated use in the long term.

As described above, the base layer according to the present disclosure is capable of containing a predetermined amount of water again by being left to stand in the air under an environment of a temperature of 23° C. and a relative humidity of 50% for 48 hours even after temporarily taking on a dry state. Therefore, regarding the electrophotographic belt according to the present disclosure, even when the water in the base layer is temporarily consumed through vaporization or decomposition due to application of a high voltage, water is absorbed again. Consequently, during use in the long term, the binder resin is continuously suppressed from being carbonized. As a result, it is considered to be possible to suppress the electro-conductivity from changing during use in the long term.

Regarding the electrophotographic belt according to the present disclosure, the glass transition point of PPS suitable for using as the binder resin is 92° C. and that of PEEK is 143° C. Since an endothermic effect of the water is exerted from a temperature sufficiently lower than the glass transition point of the binder resin, the endothermic effect is also expected as an effect of suppressing the electrical resistance from changing under an influence of, for example, contraction of the resin due to heat generation.

Regarding the electrophotographic belt according to the present disclosure, a change in the weight is measured using a thermogravimetry apparatus or the like under the following condition. A plurality of specimens cut into 4 mm×4 mm out of the electrophotographic belt are stacked on a platinum sample pan having a volume of 50 μL or 100 μL so that a total weight is set to be 15 mg±4 mg.

Subsequently, a mass of the specimen when in a nitrogen atmosphere a temperature of the specimen is increased from a temperature of 30° C. to a temperature of 100° C. at a rate of 20° C. per min. is maintained at 100° C. for 30 minis denoted as X1. A mass of the specimen w % ben in a nitrogen atmosphere the specimen is thereafter cooled from a temperature of 100° C. to a temperature of 30° C. at a rate of 20° C. per min and the specimen is left to stand in the air under an environment of a temperature of 23° C. and a relative humidity of 50% for 48 hours is denoted as X2. In such an instance, a weight change rate calculated by ((X2−X1)/X2)−100 is denoted as a water content of the electrophotographic belt. The water content of the electrophotographic belt according to the present disclosure is 0.6% or more. In this regard, when a binder resin containing no carbon black was similarly evaluated alone, the water content of a PEEK resin was less than 0.04%, and the water content of a PPS resin is less than 0.01%.

There is no particular limitation regarding the electroconductivity of the base layer, and in consideration of primary transferability and second transferability when the base layer is used as the intermediate transfer belt, for example, the surface resistivity is preferably within the range of $1.0\times10^{3}$ Ω/□ or more and $1.0\times10^{14}$ Ω/□ or less. The surface resistivity is more preferably within the range of $1.0\times10^{5}$ Ω/□ or more and $1.0\times10^{13}$ Ω/□ or less.

The thickness of the base layer is preferably, for example, 25 μm or more and 100 μm or less.

Binder Resin

The electrophotographic belt is required to have strength so that the electrophotographic belt is not elongated even when a tension load is continuously applied in the long term in the electrophotographic image-forming apparatus. Therefore, a thermoplastic resin material serving as the binder resin in the base layer can be a material classified in the super engineering plastic. In this regard, the base layer according to the present disclosure contains at least one resin selected from the group consisting of PEEK and PPS as the binder resin.

Regarding each of PEEK and PPS, commercially available products of various grades are provided. In the present disclosure, a single grade may be used, or at least two types of grades may be used in combination.

Examples of the commercially available product of PEEK include a trade name "VICTREX PEEK" series produced by Victrex. Examples of the grade include grades such as PEEK "450G", "381G", and "151G".

Examples of the commercially available PPS include a trade name "Torelina" series produced by Toray Industries, Ltd., and PPS resins (trade name: "Super Tough PPS", "Glass Fiber Reinforced PPS", "Inorganic Filler Reinforced PPS", and "Modified Alloy PPS") produced by DIC Corporation. Examples of the grade include grades such as Torelina "A-900", "A670X01", and "A756MX02".

Carbon Black

The base layer according to the present disclosure contains carbon black as an electro-conductivity imparting agent.

The melting point of PEEK used as the binder resin is, for example, about 330° C., and the melting point of the PPS is 280° C. or higher. Consequently, when an electro-conductive base layer having an endless shape is produced using these resins, it is difficult to use an ionic conductivity imparting agent, and carbon black is used. In this regard, to achieve the above-described surface resistivity by using carbon black, the content of carbon black in the base layer can be set to be within the range of, for example, 15% by mass or more and 30% by mass or less relative to the mass of the base layer.

Regarding the carbon black, carbon black having a CB water absorption rate described below of 0.7% by mass or more can be used.

CB Water Absorption Rate

That is, as described above, it is considered that carbonization of the binder resin in the base layer is caused mainly by a high voltage applied between particles of carbon black. In this regard, carbon black having a large amount of water adsorption being used as the carbon black contained in the base layer enables the water content in the base layer to become 0.6% or more. Herein, the base layer containing PEEK or PPS as the binder resin has to undergo kneading at about 300° C. to 400° C. during a production process thereof. Therefore, carbon black contained in the base layer according to the present disclosure can maintain the capability of adsorbing a predetermined amount of water even after being heated at 300° C. to 400° C. In this regard, specifically, the carbon black having a water absorption rate determined through steps (i) to (iii) below is 0.7% by mass or more can be used.

step (i): carbon black is fired in a nitrogen atmosphere at a temperature of 430° C. for 6 hours so as to prepare heat-treated carbon black step (ii): the resulting heat-treated carbon black is left to stand under the condition of a temperature of 23° C. and a relative humidity of 50% for 48 hours, and thereafter a mass (W0) is measured using a thermogravimetric analyzer (TGA)

step (iii): a temperature of the heat-treated carbon black after the mass (W0) is measured is increased from a temperature of 30° C. to a temperature of 120° C. at a rate of 20° C. per min in a nitrogen atmosphere, the temperature is maintained at 120° C. for 15 min, and a mass (W1) is measured also using the thermogravimetric analyzer (TGA)

Subsequently, the amount of water absorbed by the heat-treated carbon black being left to stand under the condition of a temperature of 23° C. and a relative humidity of 50% for 48 hours is calculated by calculation formula (1) below and is denoted as the water absorption rate of the carbon black (CB water absorption rate) according to the present disclosure.

$$[(W0-W1),W0]\times10^{0} \qquad (1)$$

CB Water Content

Adsorption of water to carbon black is due to a functional group present on the surface of the carbon black or due to the structure form of the carbon black. Herein, it is considered that a functional group on the surface of the carbon black disappears during kneading of the carbon black with PEEK or PPS at a temperature higher than the melting point thereof. Therefore, the capability of adsorbing water due to the functional group is lost after kneading with PEEK or PPS. On the other hand, the structure form of the carbon black is hardly lost by undergoing the kneading process with PEEK or PPS. Therefore, it is considered that water adsorption by the structure form is reversible. That is, when the carbon black having a developed structure form is present in the base layer, even if a high voltage is applied between carbon black particles and the water adsorbed by the carbon black is lost through vaporization or electrolysis, water in the surrounding environment is absorbed into the structure of the carbon black. As a result, it is considered that the base layer is able to stably contain a predetermined amount of water.

To obtain the base layer having a water content of 0.6% or more according to the present disclosure, carbon black capable of holding a predetermined amount or more of water in addition to having the above-described CB water absorption rate of 0.7% or more can be used as the carbon black.

In this regard, the amount of water held by carbon black is measured and calculated through steps (iv) and (v) below regardless of the presence or absence of a high-temperature firing step according to step (i) above.

step (iv): the assessment target carbon black is left to stand under the condition of a temperature of 23° C. and a relative humidity of 50% for 48 hours, and thereafter a mass (W2) is measured using a TGA step (v): a temperature of the carbon black after the mass (W2) is measured is increased from a temperature of 30° C. to a temperature of 120° C. at a rate of 20° C. per min in a nitrogen atmosphere, the temperature is maintained at 120° C. for 15 min. and a mass (W3) is measured using the TGA The amount of water of which the carbon black can hold, hereafter also referred to as "CB water content", is calculated by calculation formula (2) below. In this regard, the unit of the CB water content is %.

$$((W2-W3)/W2)\times 100 \quad (2)$$

Regarding commercially available carbon black "#3230B" and "PrintexL" below, the CB water content (%) determined by calculation formula (2) above and the CB water absorption rate (%) determined by calculation formula (1) above are presented in Table 1 below.

"#3230B" (trade name, produced by Mitsubishi Chemical Corporation)

"PrintexL" (trade name, produced by Orion Engineered Carbons)

TABLE 1

| Carbon black species | CB water content (%) | CB water absorption rate (%) |
|---|---|---|
| "#3230B" | 2.36 | 0.98 |
| "PrintexL" | 1.29 | 0.37 |

"PrintexL" has a relatively high CB water content but has a very low CB water absorption rate. Consequently, it is considered that "PrintexL" contains water due to a functional group on the surface of the carbon black. On the other hand, "#3230B" adsorbs large amount of water compared with "PrintexL" even after undergoing high-temperature firing.

Consequently, it is considered that "#3230B" has a developed structure form and is capable of reversely adsorbing a large amount of water.

Therefore, for example, "#3230B" having a CB water content of 2.36% and a CB water absorption rate of 0.98% can be used as the carbon black contained in the base layer according to the present disclosure. In this regard, examples of the commercially available carbon black having a CB water absorption rate of 0.7% by mass or more include "#44B" (trade name, produced by Mitsubishi Chemical Corporation; water absorption rate=0.95%). However, the CB water content of "#44B" is 0.96% by weight, and the amount of water held is small relative to "#3230B". Consequently, when "#44B" is used as the carbon black, it is difficult to obtain a base layer having a water content of 0.6%. The carbon black capable of being used for obtaining the base layer according to the present disclosure is not limited to "#3230B", and it is considered that carbon black having a CB water content and a CB water absorption rate substantially equal to or higher than those of "#3230B" is capable of providing the base layer having a water content of 0.6% according to the present disclosure.

The CB water absorption rate may also be measured and calculated by subjecting the carbon black extracted from the base layer to steps (i) to (iii) above. Specifically, for example, when the binder resin is PEEK, the PEEK in a sample taken out of the base layer being decomposed by heating the sample in a nitrogen gas atmosphere at a temperature of 600° C. for 1 hour enables the PEEK in the sample to be decomposed and enables the carbon black in the base layer to be extracted.

The carbon black according to the present disclosure can have a primary particle diameter of 15 nm or more and less than 35 nm. The primary particle diameter being within the above-described range enables the carbon black to be reliably suppressed from deteriorating due to the heat applied during a production process of the base layer. In addition, the carbon black is more uniformly dispersed into the binder resin.

Method for Producing Electrophotographic Belt

The electrophotographic belt may be produced through the following steps,

- a step of producing an electrophotographic electro-conductive resin composition having a pellet shape by melt-kneading a thermoplastic resin and an electro-conductive filler and
- a step of melting the electrophotographic electro-conductive resin composition having a pellet shape by using a single-screw extruder, extruding the molten material through a cylindrical slit disposed at the extruder front edge, cooling the extruded material by using a cylindrical cooling mandrel, and performing cutting into a predetermined length.

The step of producing an electrophotographic electro-conductive resin composition having a pellet shape by melt-kneading an electro-conductive filler and a thermoplastic resin will be described.

Melt-kneading of an electro-conductive filler and a thermoplastic resin may be performed by a known method. For example, a single-screw extruder, a two-screw kneading extruder, a Banbury mixer, a roll, Brabender, Plastgraph, a kneader, or the like may be used. Of these, a single-screw extruder and a two-screw kneading extruder can be used in consideration of performing melt-kneading while a material is continuously supplied and forming the melt-kneaded resin composition into a pellet shape. In such an instance, to improve dispersion of the carbon black in the thermoplastic resin and to impart a specific function, necessary additives may be added. Since the carbon black suitable for the present disclosure contains a large amount of water, kneading can be performed while decompression-deaeration is performed during heating.

The temperature during melt-kneading of the electro-conductive filler and the thermoplastic resin is higher than or equal to the glass transition temperature of the thermoplastic resin, and melt-kneading is performed in a temperature range in which the thermoplastic resin is not decomposed. For example, when a PEEK resin is used, the melt-kneading temperature is preferably 250° C. or higher and 400° C. or lower and further preferably 300° C. or higher and 400° C. or lower. If the melt-kneading temperature is lower than or equal to the glass transition temperature, the viscosity of the resin is significantly increased, and large shear is applied during melt-kneading so that the resin deteriorates due to the molecular structure being cut. In addition, if the melt-kneading temperature is 400° C. or higher, oxidation-cross-linking of the resin proceeds so that very strong structure is formed and a foreign substance is produced.

Steps of forming the electrophotographic electro-conductive resin composition having a pellet shape into an electrophotographic belt will be described.

The resulting electrophotographic electro-conductive resin composition having a pellet shape is melted in a single-screw extruder and extruded into the shape of a tube through a cylindrical slit disposed at the extruder front edge. Subsequently, the resin composition extruded into the shape of a tube is cut into a predetermined length while the temperature is controlled by using a cylindrical cooling mandrel so as to obtain the electrophotographic belt base layer.

The resulting base layer may be further subjected to heating-cooling treatment. The mechanical strength of PEEK or PPS significantly varies in accordance with the crystallinity. Therefore, the electrophotographic belt having predetermined mechanical strength is obtained by performing heating-cooling treatment in accordance with the use conditions so as to adjust the crystallinity.

The base layer obtained through the above-described steps may temporarily have a small water content immediately after production since the heating step is applied. However, storing in an environment of a temperature of 23° C. and a relative humidity of 50% for 48 hours enables the base layer to have a water content of 0.6% or more.

Thereafter, as the situation demands, the base layer obtained as described above may be provided with a surface layer for covering the outer peripheral surface or a back surface layer for covering the inner peripheral surface. Examples of the surface layer include layers having excellent abrasion resistance and containing a cured product of an active-energy-radiation-curable resin such as an acrylic resin. In such an instance, the surface layer may be disposed by, for example, applying the composition containing the active-energy-radiation-curing resin such as a photo-curable resin on the outer peripheral surface of the base layer and performing curing. There is no particular limitation regarding the thickness of the surface layer, and the thickness can be, for example, 1 μm to 5 μm. Examples of the back surface layer include a resin layer for reinforcing the base layer and an electro-conductive layer for imparting the electro-conductivity to the inner peripheral surface of the electrophotographic belt. There is no particular limitation regarding the thickness of the back surface layer, and the thickness can be, for example, 0.05 μm to 10 μm.

Electrophotographic Apparatus

An embodiment of the electrophotographic apparatus in which the electrophotographic belt according to the present disclosure is used as an intermediate transfer belt will be described. FIG. 1 is a schematic sectional view illustrating an electrophotographic apparatus 100 according to an aspect of the present disclosure. The electrophotographic apparatus 100 is a tandem type color laser printer that adopts an intermediate transfer system and is capable of forming a full color image by using an electrophotographic system.

The electrophotographic apparatus 100 includes first, second, third, and fourth image forming portions PY, PM, PC, and PK as a plurality of image forming portions. The first, second, third, and fourth image forming portions PY, PM, PC, and PK are arranged in this order in the movement direction of a flat portion (image transfer surface) of an intermediate transfer belt 7 described later. Regarding the first, second, third, and fourth image forming portions PY, PM, PC, and PK, elements having the same or corresponding function or configuration may be collectively described where final symbols Y, M, C, and K indicating that the element is for the respective color are omitted. In the present embodiment, the image forming portion P is configured to including a photosensitive drum 1, a charging roller 2, an exposing unit 3, a developing unit 4, and a primary transfer roller 5.

The image forming portion P includes the photosensitive drum 1 that is a drum-type (cylindrical) photosensitive member (electrophotographic photosensitive member) serving as an image-bearing member. The photosensitive drum 1 is formed by successively stacking a charge generation layer, a charge transport layer, and a surface protective layer on an aluminum cylinder serving as a base member. The photosensitive drum 1 is driven to rotate in the direction of arrows R1 (counterclockwise) in FIG. 1. The surface of the rotating photosensitive drum 1 is subjected to treatment of uniform charging to a predetermined potential of predetermined polarity (negative polarity in the present embodiment) by a charging roller 2 that is a roller-like charging member serving as a charging device. During the charging step, a predetermined charging bias (charging voltage) containing a negative polarity direct current component is applied to the charging roller 2. The surface of the photosensitive drum 1 subjected to charging treatment is scanning-exposed in accordance with image information by using an exposing unit (laser scanner) 3 serving as an exposing device so that an electrostatic image (electrostatic latent image) is formed on the photosensitive drum 1.

The electrostatic image formed on the photosensitive drum 1 is developed (visualized) due to a toner serving as a developing agent being supplied by the developing unit 4 serving as a developing device so that a toner image (developing-agent image) is formed on the photosensitive drum 1. During the developing step, a predetermined developing bias (developing voltage) containing a negative polarity direct current component is applied to a developing roller **4*a* serving as a developing-agent-bearing member included in the developing unit 4. In the present embodiment, the toner charged having the same polarity (negative polarity in the present embodiment) as the charge polarity of the photosensitive drum 1 is attached to an exposing portion (imaging portion) on the photosensitive drum 1** at which the absolute value of the potential is reduced due to being exposed after being subjected to uniform charging treatment.

An intermediate transfer belt 7 composed of an endless belt serving as an intermediate transfer member is arranged so as to oppose the four photosensitive drums 1. The intermediate transfer belt 7 is looped around a driving roller 71, a tension roller 72, and an opposing roller for secondary transfer 73, which serve as a plurality of stretching rollers, so as to be stretched at a predetermined tension. The intermediate transfer belt 7 is brought into contact with the photosensitive drums 1 and is rotated (circulating movement) in the direction of arrow R2 (clockwise) in FIG. 1 due to the driving roller 71 being driven to rotate. A primary transfer roller 5 that is a roller-like primary transfer member serving as a primary transfer device corresponding to each photosensitive drum 1 is arranged on the inner peripheral surface side of the intermediate transfer belt 7. The primary transfer roller 5 is pressed against the intermediate transfer belt 7 toward the photosensitive drum 1 so as to form a primary transfer portion (primary transfer nip) T1 in which the photosensitive drum 1 is in contact with the intermediate transfer belt 7. As described above, the toner image formed on the photosensitive drum 1 is primary-transferred on the circulating intermediate transfer belt 7 due to the action of the primary transfer roller 5 in the primary transfer portion T1.

During primary transferring step, a primary transfer bias (primary transfer voltage) that is a direct current voltage having polarity (positive polarity in the present embodiment) opposite to the regular charge polarity (charge polarity during developing step) of the toner is applied to the primary transfer roller 5. The primary transfer roller 5 that is composed of a metal rotating shaft and an elastic layer formed on the outer peripheral surface of the rotating shaft and that has resistance adjusted to a predetermined value is frequently used. However, in recent years, in accordance with size reduction and cost reduction of the unit, units composed of a metal roller that is formed of SUM (sulfur and sulfur composite free-cutting steel), SUS (steel use stainless), or the like and that has a straight shape in the thrust direction have increased. Regarding such primary transfer, to ensure a sufficient transfer ratio, usually a several kV of transfer voltage is applied, and in such an instance, discharge may occur in the vicinity of a transfer nip. The discharge is a cause of a reduction in the surface characteristics of the intermediate transfer member. When the primary transfer roller is composed of a metal roller, a transfer nip is narrow compared with a primary transfer roller including an elastic layer so that discharge tends to occur. Therefore, the effect of the electrophotographic belt according to the present disclosure is more significantly exerted by a unit in which the primary transfer roller 5 is composed of a metal roller.

A secondary transfer roller 8 that is a roller-like secondary transfer member serving as a secondary transfer device is arranged at the position opposing the opposing roller for secondary transfer 73 on the outer peripheral surface side of the intermediate transfer belt 7. The secondary transfer roller 8 is pressed against the intermediate transfer belt 7 toward the opposing roller for secondary transfer 73 so as to form a secondary transfer portion (secondary transfer nip) T2 in which the intermediate transfer belt 7 is in contact with the secondary transfer roller 8. As described above, the toner image formed on the intermediate transfer belt 7 is secondary-transferred on a recording material (sheet, transfer material) S such as paper (sheet) pinched between the intermediate transfer belt 7 and the secondary transfer roller 8 and conveyed due to the action of the secondary transfer roller 8 in the secondary transfer portion T2.

During secondary-transferring step, a secondary transfer bias (secondary transfer voltage) that is a direct current voltage having polarity opposite to the regular charge polarity of the toner is applied to the secondary transfer roller 8. Regarding the secondary transfer, to ensure a sufficient transfer ratio, usually a several kV of transfer voltage is applied. Likewise, the above-described image formation operation is performed in units Pm, Pc, and Pk of magenta (M), cyan (C), and black (K), respectively, in accordance with the movement of the intermediate transfer belt 7 so as to stack toner images of four colors of yellow, magenta, cyan, and black on the intermediate transfer belt 7. The four toner layers are conveyed in accordance with the movement of the intermediate transfer belt 7 and are collectively transferred onto a recording material S (hereafter also referred to as "second image-bearing member") conveyed at a predetermined timing in the secondary transfer portion T2 by using the secondary transfer roller 8 serving as the secondary transfer device. Regarding such secondary transfer, to ensure a sufficient transfer ratio, usually a several kV of transfer voltage is applied, and in such an instance, discharge may occur in the vicinity of a transfer nip. The discharge is a cause of a reduction in the electrical resistance value of the intermediate transfer belt.

The recording material S is supplied from a cassette 12 containing the recording material S to a conveyance path by using a pickup roller 13. The recording material S supplied to the conveyance path is conveyed to the secondary transfer portion T2 by using a conveying roller pair 14 and a registration roller pair 15 where the timing is set in accordance with a toner image on the intermediate transfer belt 7.

The recording material S to which the toner image is transferred is conveyed to a fixing unit 9 serving as a fixing device. The fixing unit 9 fixes (melts, sticks) the toner image to the recording material S by heating and pressurizing recording material S bearing an unfixed toner image. The recording material S to which the toner image is fixed is discharged (output) to outside the apparatus main body of the electrophotographic apparatus 100 by using a conveying roller pair 16, a discharging roller pair 17, and the like.

A toner remaining on the surface of the photosensitive drum 1 without being transferred to the intermediate transfer belt 7 in the primary transfer step (primary-transfer remaining toner) is recovered simultaneously with development by using the developing unit 4 also serving as a photosensitive member cleaning device. In addition, a toner remaining on the surface of the intermediate transfer belt 7 without being transferred to the recording material S in the secondary transfer step (secondary-transfer remaining toner) is removed and recovered from the surface of the intermediate transfer belt 7 by using a belt cleaning unit 11 serving as an intermediate transfer belt cleaning device. The belt cleaning unit 11 is arranged downstream of the secondary transfer portion T2 and upstream of the uppermost-stream primary transfer portion Tly (position opposing the driving roller 71 in the present embodiment) in the rotational direction of the intermediate transfer belt 7. The belt cleaning unit 11 scrapes the secondary-transfer remaining toner off the surface of the circulating intermediate transfer belt 7 by using a cleaning blade serving as a cleaning member arranged in contact with the surface of the intermediate transfer belt 7 and the scraped toner is contained in a recovery container 1 lb.

As described above, in the image forming operation, an electrical transfer process of a toner image from the photosensitive drum 1 to the intermediate transfer belt 7 and from the intermediate transfer belt 7 to the recording material S is repeatedly performed. In addition, the electrical transfer process is further repeatedly performed by image formation on many recording materials S being repeated.

In this regard, the electrophotographic belt being used as the intermediate transfer belt in the electrophotographic image-forming apparatus enables high-quality electrophotographic images to be repeatedly formed in the long term.

According to an aspect of the present disclosure, an electrophotographic belt capable of suppressing the electrical resistance from being reduced even when repeatedly used as an intermediate transfer belt in the long term is obtained. In addition, according to another aspect of the present disclosure, an electrophotographic image-forming apparatus capable of stably forming high-quality electrophotographic images in the long term is obtained.

EXAMPLES

The electrophotographic belt and the electrophotographic image-forming apparatus according to the present disclosure will be more specifically described below with reference to the examples. In this regard, the present disclosure is not limited to only the configuration realized in the example. In the examples and the comparative examples, "part" is on a mass basis, unless otherwise specified.

Preparation of Carbon Black

Each carbon black presented in Table 2 below was prepared as an electro-conductive filler used for producing the intermediate transfer belt according to the example or the comparative example. In this regard, prior to kneading with the binder resin, carbon black was fired (heat-treated) in a nitrogen atmosphere at a temperature of 430° C. for 6 hours so as to remove impurities and the like.

Physical properties (amount of DBP absorption, primary particle diameter, BET specific surface area, and amounts of water absorption before and after firing (heat treatment) of each carbon black are presented in Table 2.

The amount of DBP absorption may be determined from an amount of dibutyl phthalate (DBP) added when dibutyl phthalate is dripped to 100 g of carbon black under agitation and a torque becomes maximum (JIS K 6221).

Regarding the primary particle diameter, usually, carbon black is present in a state in which a plurality of primary particles are three-dimensionally continuous in the same manner as a bunch of grapes. The primary particle diameter denotes a particle diameter of a minimum unit of carbon black (primary particle) constituting a pigment particle. The primary particle diameter of the carbon black may be determined by observing and measuring a particle diameter of a minimum unit of carbon black constituting a pigment particle by using a transmission type or scanning type electron microscope and calculating an arithmetic average value of about 100 minimum units.

The BET specific surface area may be determined from the amount of nitrogen adsorbed on the particle surface of the carbon black when the deaerated carbon black is immersed in liquid nitrogen and equilibrium is reached (JIS K 6217).

TABLE 2

| Abbreviation | Maker | trade name | Primary particle diameter nm | Amount of DBP absorption mL/100 g | BET specific surface area $m^2/g$ | CB water content wt % | Water absorption rate wt % |
|---|---|---|---|---|---|---|---|
| CB-A | Mitsubishi Chemical | "#44B" | 24 | 77 | 110 | 0.96 | 0.95 |
| CB-B | Mitsubishi Chemical | "#3230B" | 23 | 140 | 220 | 2.36 | 0.98 |
| CB-C | Orion Engineered Carbons | "Printext." | 23 | 120 | 150 | 1.29 | 0.37 |
| CB-D | Denka | "Denka Black" | 35 | 180 | 69 | 0.22 | 0.20 |
| CB-E | Mitsubishi Chemical | "#3050B" | 50 | 175 | 50 | 0.36 | 0.28 |

Example 1

Production of Electrophotographic Belt

Premixing

A PEEK resin (trade name: 381G, produced by Victrex) and the heat-treated carbon black were weighed so that the mixing ratio was set to be as presented in Table 3 and were mixed using a Henschel mixer (FM-150L/I produced by NIPPON COKE & ENGINEERING CO., LTD.). Regarding the operation condition and treatment condition of the Henschel mixer, a blade rotational speed was set to be 1,500 rpm, an amount of treatment was set to be 30 kg, a treatment time was set to be 5 min, and a treatment temperature was set to be 50° C.

Melt-Kneading

A mixture obtained by the premixing was placed into a two-screw kneader (PCM43 produced by Ikegai Corporation) and was melt-kneaded under the condition of an amount of extrusion of 6 kg/h, a screw rotational speed of 100 rpm, and a barrel control temperature of 360° C. so as to obtain a resin composition. In this regard, decompression-deaeration was performed through an upstream vent hole during kneading so as to remove vaporized materials.

Melt Extrusion

The resin composition obtained through the melt-kneading step was pelletized. Subsequently, the resulting pellet was subjected to extrusion molding by using a single-screw extruder (Research Laboratory of Plastics Technology Co., Ltd.) provided with a spiral cylindrical die at the front edge portion under the condition of an amount of extrusion of 6 kg/h and a die temperature of 380° C. so as to obtain a cylindrical film.

The resulting cylindrical film was fit over a cylindrical die and annealed at a temperature of 230° C. for 5 min. During the annealing treatment, the temperature increasing rate was set to be 100° C./min, and the temperature decreasing rate was set to be 200° C./min. The cylindrical film was released from the cylindrical die so as to obtain an electrophotographic belt composed of only a base layer. The thickness of the resulting electrophotographic belt was 50 sm.

Evaluation of Electrophotographic Belt

After the produced electrophotographic belt was left to stand under an environment at a temperature of 23° C. and a relative humidity of 50% for 48 hours, various evaluations were performed.

Evaluation 1: Calculation of Water Content

A specimen was cut out of the base layer of the produced electrophotographic belt, and the water content was measured. In the present example, a thermogravimetry apparatus (Q500 produced by TA Instruments) was used for the measurement.

A plurality of specimens cut into 4 mm×4 mm out of the electrophotographic belt were stacked on a platinum sample pan having a volume of 50 μL or 100 μL so that a total weight was set to be 15 mg±4 mg. Subsequently, a mass of the specimen when a temperature of the specimen was increased from a temperature of 30° C. to a temperature of 100° C. at a rate of 20° C. per min in a nitrogen atmosphere and the temperature was maintained at 100° C. for 30 min was denoted as X1. A mass of the specimen whien in a nitrogen atmosphere the specimen was thereafter cooled from a temperature of 100° C. to a temperature of 30° C. at a rate of 20° C. per min and the specimen was left to stand in the air under an environment of a temperature of 23° C. and a relative humidity of 50% for 48 hours was denoted as X2. The water content was calculated by Formula (1) above.

Evaluation 2: Mechanical Strength and Bending Resistance

A portion of the electrophotographic belt was cut, and a bending resistance test was performed for evaluating mechanical strength. In the present disclosure, the MIT test specified in JIS P 8115 was applied as a break fatigue resistance test (bending fatigue test), the bending radius R was changed to 2.5, times of bending until breakage occurred was assumed as the bending strength, and evaluation was performed as described below.

Rank "A": breakage did not occur when the number of times of bending was 1,000,000 or more Rank "B": breakage occurred when the number of times of bending was 100,000 or more and less than 1,000.000

Rank "C": breakage occurred when the number of times of bending was 10,000 or more and less than 100,000

Rank "D": breakage occurred when the number of times of bending was less than 10,000

Evaluation 3: Measurement of Surface Resistivity (Initial Stage)

The surface resistivity of the electrophotographic belt was measured. The surface resistivity was measured at 40 points in total of 5 points in the width direction by 8 points in the circumferential direction by using a resistivity meter (trade name: Hiresta, produced by Nittoseiko Analytech Co., Ltd.) under the condition of an applied voltage of 100 V and after 10 sec.

Evaluation 4: Durability Assessment (1) Image Assessment

The produced electrophotographic belt was installed as an intermediate transfer belt in an intermediate transfer unit of a copying machine (trade name: "IR-ADVANCE C5051" produced by CANON KABUSHIKI KAISHA), and an image quality test was performed. Regarding a printing test, 600,000 sheets of full color images were printed using A4-sized sheets (trade name: "GF-600" (basis weight of 60 $g/m^2$) produced by CANON KABUSHIKI KAISHA) under an environment of a temperature of 15° C. and a relative humidity of 10%. Thereafter, to examine a change in performance of the intermediate transfer belt in the circumferential direction, 20 sheets of magenta solid images were output, the resulting 20 sheets of magenta solid images were visually observed, and each image was examined whether uneven density occurred and was evaluated in accordance with the following criteria.

Rank "A": uneven density was not observed in all printed images

Rank "B": uneven density was observed in 1 or more and 3 or less sheets of printed images Rank "C": uneven density was observed in 4 or more sheets of printed images (2) Measurement of Surface Resistivity (after Durability Test)

After 600,000 (600 K) sheets were printed, the electrophotographic belt was removed, and the surface resistivity was measured under the same condition as that of the measurement of the surface resistivity (initial stage) performed in "Evaluation 3" above. Subsequently, an amount of change and a change rate of the surface resistivity before and after the durability test were calculated from the measured surface resistivity after the durability test and the surface resistivity (initial stage) measured in advance. In this regard, the change rate (%) was determined by dividing a difference between the surface resistivity (initial stage) and the surface resistivity (after durability test) by the surface resistivity (initial stage).

Example 2

A PPS resin (A-900 produced by Toray Industries, Ltd.) was used as the thermoplastic resin, and the resin ratio and the amount of mixing of carbon black were adjusted as presented in Table 3.

Since the glass transition temperature of the PPS resin was 280° C., melt-kneading was performed within the temperature range of 290° C. or higher and 330° C. or lower. In addition, extruding molding was also performed within the temperature range of 290° C. or higher and 330° C. or lower. The annealing temperature was set to be 150° C. An electrophotographic belt was produced in the manner akin to that of Example 1 except for the above.

Comparative Example 1

An electrophotographic belt was produced in the manner akin to that of Example 1 except that the type and the amount of mixing of the carbon black were adjusted as presented in Table 3.

Comparative Example 2

The resin ratio and the amount of mixing of the carbon black were adjusted as presented in Table 3, and the melt-kneading step was repeated three times. An electrophotographic belt was produced in the manner akin to that of Comparative example 1 except for the above.

Comparative Example 3

An electrophotographic belt was produced in the manner akin to that of Example 1 except that the type and the amount of mixing of the carbon black were adjusted as presented in Table 3.

Comparative Example 4

An electrophotographic belt was produced in the manner akin to that of Comparative example 1 except that the resin ratio and the amount of mixing of the carbon black were adjusted as presented in Table 3, and the melt-kneading step was repeated six times.

Comparative Examples 5 and 6

Electrophotographic belts were produced in the manner akin to that of Example 1 except that the resin ratio and the type and the amount of mixing of the carbon black were adjusted as presented in Table 3.

The evaluation results of the electrophotographic belts according to Examples 1 and 2 and Comparative examples 1 to 6 are presented in Table 3.

Regarding the electrophotographic belts according to Examples 1 and 2, a change in the surface resistivity after the durability test relative to the initial value was very small. In addition, the result of image assessment was Rank "A" in Evaluation 4(1).

On the other hand, regarding the electrophotographic belts according to Comparative example 1, Comparative example 3, and Comparative examples 5 and 6, which had a water content of less than 0.6, the surface resistivity after the durability test significantly changed. Regarding the electrophotographic belts according to Comparative example 1, Comparative example 3, and Comparative example 5, the result of image assessment was Rank "C" in Evaluation 4(1).

Regarding the electrophotographic belts according to Comparative example 2 and Comparative example 4, the dispersibility of the carbon black in the resin was improved by repeating the step of melt-kneading the resin and the carbon black a plurality of times during the production process. As a result, a change in the surface resistivity in Evaluation 4(2) was able to be reduced compared with Comparative examples 1, 3, and 5. However, the mechanical strength and the bendability in Evaluation 2 deteriorated. It is considered that the cause of deterioration in the mechanical strength and the bendability is due to the resin deteriorating by the number of times of kneading of the resin and the carbon black being increased.

According to the present disclosure, an electrophotographic belt capable of significantly reducing a change in the surface resistivity even in the long-term use is obtained without repeatedly performing kneading of the resin and the carbon black which may cause deterioration in the mechanical strength and the bendability.

TABLE 3

| | | Resin species | Resin ratio (wt %) | Carbon black Abbreviation | Carbon black Amount (wt %) | Number of times of kneading | Evaluation 1 Water content of electrophotographic belt (wt %) | Evaluation 2 Mechanical strength MIT strength Rank | Evaluation 2 Bendability Number of times of bending thousand times | Evaluation 3 Surface resistivity ($\times 10^{10}$ Ω/□) | Evaluation 4(1) 600K sheets durability test Rank | Evaluation 4(1) 600K sheets durability test Number of defective images (sheet) | Evaluation 4(2) Surface resistivity (Ω/□) | Evaluation 4(2) Resistance change (⊿ digit) | Evaluation 4(2) Change rate (%) |
|---|---|---|---|---|---|---|---|---|---|---|---|---|---|---|---|
| Example | 1 | PEEK | 80 | CB-B | 20 | 1 | 0.72 | A | 1000 or more | 3.00 | A | 0 | $2.85 \times 10^{10}$ | 0.02 | 5.0 |
| | 2 | PPS | 81 | CB-B | 19 | 1 | 0.69 | B | 260 | 4.00 | A | 0 | $3.70 \times 10^{10}$ | 0.03 | 7.5 |
| Comparative example | 1 | PEEK | 81 | CB-C | 19 | 1 | 0.25 | A | 1000 or more | 5.00 | C | 7 | $1.57 \times 10^{9}$ | 1.50 | 96.9 |
| | 2 | PEEK | 76 | CB-C | 24 | 3 | 0.25 | C | 90 | 5.00 | B | 2 | $1.58 \times 10^{10}$ | 0.50 | 68.4 |
| | 3 | PEEK | 83 | CB-D | 17 | 1 | 0.19 | A | 1000 or more | 4.00 | C | 12 | $4.00 \times 10^{6}$ | 4.00 | 100.0 |
| | 4 | PEEK | 74 | CB-D | 26 | 6 | 0.18 | D | 3 | 6.00 | B | 3 | $1.50 \times 10^{10}$ | 0.60 | 75.0 |
| | 5 | PEEK | 80 | CB-E | 20 | 1 | 0.21 | A | 1000 or more | 6.00 | C | 8 | $1.90 \times 10^{8}$ | 2.50 | 99.7 |
| | 6 | PEEK | 79 | CB-A | 21 | 1 | 0.51 | A | 1000 or more | 5.00 | A | 0 | $3.96 \times 10^{10}$ | 0.10 | 20.6 |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-188142 filed Nov. 18, 2021, which is hereby incorporated by reference herein in its entirety.

What is claimed is:

1. An electrophotographic belt comprising:

a base layer that contains a binder resin; and carbon black in the binder resin, the binder resin containing at least one resin selected from the group consisting of PEEK and PPS, and a water content calculated by $((X2-X1)/X2)\times 100$ being 0.6% or more, where X1 is a mass of a specimen cut out of the base layer when in a nitrogen atmosphere a temperature of the specimen is increased from a temperature of 30° C. to a temperature of 100° C. at a rate of 20° C. per min and maintained at 100° C. for 30 min, and X2 is a mass of the specimen when in a nitrogen atmosphere the specimen is thereafter cooled from a temperature of 100° C. to a temperature of 30° C. at a rate of 20° C. per min and the specimen is left to stand in the air under an environment of a temperature of 23° C. and a relative humidity of 50% for 48 hours, wherein the carbon black has:

a primary particle diameter of 15 nm or more and less than 35 nm, and a water absorption rate determined through steps (i) to (iii) and calculation formula (1) is 0.7% or more, step (i): carbon black is fired in a nitrogen atmosphere at a temperature of 430° C. for 6 hours so as to prepare heat-treated carbon black, step (ii): the resulting heat-treated carbon black is left to stand under the condition of a temperature of 23° C. and a relative humidity of 50% for 48 hours, and thereafter a mass (W0) is measured using a thermogravimetric analyzer (TGA), and step (iii): a temperature of the heat-treated carbon black after the mass (W0) is measured is increased from a temperature of 30° C. to a temperature of 120° C. at a rate of 20° C. per min in a nitrogen atmosphere, the temperature is maintained at 120° C. for 15 min, and a mass (W1) is measured also using the thermogravimetric analyzer (TGA), $$[(W0-W1)/W0]\times 100 \quad (1)$$

wherein a content of the carbon black in the base layer is 15% by mass or more and 30% by mass or less relative to the mass of the base layer.

2. The electrophotographic belt according to claim 1, wherein a surface resistivity of the base layer is $1.0\times 10^{3}$ Ω/square or more and $1.0\times 10^{14}$ Ω/square or less.

3. The electrophotographic belt according to claim 1, wherein a thickness of the base layer is 25 μm or more and 100 μm or less.

4. An electrophotographic image-forming apparatus comprising:

an electrophotographic photosensitive member;

an intermediate transfer belt to which a toner image formed on the electrophotographic photosensitive member is primary-transferred; and a secondary transfer device for secondary-transferring the toner image transferred to the intermediate transfer belt to a recording medium, wherein the intermediate transfer belt is an electrophotographic belt, the electrophotographic belt includes a base layer that contains a binder resin and carbon black in the binder resin, the binder resin contains at least one resin selected from the group consisting of PEEK and PPS, and a water content calculated by $((X2-X1)/X2)\times 100$ is 0.6% or more, where X1 is a mass of a specimen cut out of the base layer when in a nitrogen atmosphere a temperature of the specimen is increased from a temperature of 30° C. to a temperature of 100° C. at a rate of 20° C. per min in a nitrogen atmosphere and the temperature is maintained at 100° C. for 30 min, and X2 is a mass of the specimen when in a nitrogen atmosphere the specimen is thereafter cooled from a temperature of 100° C. to a temperature of 30° C. at a rate of 20° C. per min and the specimen is left to stand in the air under an environment of a temperature of 23° C. and a relative humidity of 50% for 48 hours, wherein the carbon black has:

a primary particle diameter of 15 nm or more and less than 35 nm, and a water absorption rate determined through steps (i) to (iii) and calculation formula (1) is 0.7% or more, step (i): carbon black is fired in a nitrogen atmosphere at a temperature of 430° C. for 6 hours so as to prepare heat-treated carbon black, step (ii): the resulting heat-treated carbon black is left to stand under the condition of a temperature of 23° C. and a relative humidity of 50% for 48 hours, and thereafter a mass (W0) is measured using a thermogravimetric analyzer (TGA), and step (iii): a temperature of the heat-treated carbon black after the mass (W0) is measured is increased from a temperature of 30° C. to a temperature of 120° C. at a rate of 20° C. per min in a nitrogen atmosphere, the temperature is maintained at 120° C. for 15 min, and a mass (W1) is measured also using the thermogravimetric analyzer (TGA), $$[(W0-W1)/W0]\times 100 \quad (1)$$

wherein a content of the carbon black in the base layer is 15% by mass or more and 30% by mass or less relative to the mass of the base layer.

* * * * *